(12) United States Patent
Kaczmar et al.

(10) Patent No.: US 11,441,492 B2
(45) Date of Patent: Sep. 13, 2022

(54) DECELERATION CYLINDER CUT-OFF WITH SLIDING CAM

(71) Applicant: GM Global Technology Operations LLC, Detroit, MI (US)

(72) Inventors: Michael Kaczmar, Farmington Hills, MI (US); Michael A. Smith, Clarkston, MI (US); Amanda Keech, Waterford, MI (US); Pratap S. Murthy, Dexter, MI (US); Jason M. Moore, Linden, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 132 days.

(21) Appl. No.: 16/887,955

(22) Filed: May 29, 2020

(65) Prior Publication Data
US 2021/0372332 A1 Dec. 2, 2021

(51) Int. Cl.
| | |
|---|---|
| *F02D 13/06* | (2006.01) |
| *F01L 1/053* | (2006.01) |
| *F01L 13/00* | (2006.01) |
| *F02D 33/00* | (2006.01) |
| *F02D 13/02* | (2006.01) |
| *F02D 41/00* | (2006.01) |

(Continued)

(52) U.S. Cl.
CPC ............ *F02D 13/06* (2013.01); *F01L 1/053* (2013.01); *F01L 13/0005* (2013.01); *F01L 13/0036* (2013.01); *F01L 13/0063* (2013.01); *F02D 13/0203* (2013.01); *F02D 33/00* (2013.01); *F02D 41/0002* (2013.01); *F02D 41/123* (2013.01); *F01L 2001/0473* (2013.01); *F01L 2001/0537* (2013.01); *F01L 2013/001* (2013.01); *F01L 2013/0052* (2013.01); *F01L 2013/0078* (2013.01); *F01L 2013/101* (2013.01); *F02D 2200/0406* (2013.01)

(58) Field of Classification Search
None
See application file for complete search history.

(56) References Cited

U.S. PATENT DOCUMENTS

| | | | |
|---|---|---|---|
| 8,596,238 B2 * | 12/2013 | Werler | F01L 13/0042 123/90.6 |
| 9,404,396 B2 * | 8/2016 | Eppinger | F01L 1/344 |

(Continued)

FOREIGN PATENT DOCUMENTS

| | | | | |
|---|---|---|---|---|
| DE | 102007027979 A1 * | 1/2009 | | F01L 1/053 |
| DE | 102013010330 A1 * | 12/2014 | | F01L 13/0036 |

(Continued)

*Primary Examiner* — Devon C Kramer
*Assistant Examiner* — Wesley G Harris
(74) *Attorney, Agent, or Firm* — Vivacqua Crane PLLC

(57) ABSTRACT

An automobile vehicle overhead camshaft system includes multiple camshafts individually having multiple sliding camshaft barrels. Opposed ends of the camshaft barrels individually have a zero-lift lobe. Multiple intake valves are operated by a first one of the camshafts and multiple exhaust valves are operated by a second one of the camshafts. Multiple actuators operate during a deceleration cylinder cut-off (DCCO) mode to slidably displace the camshaft barrels to position the zero-lift lobe of predetermined ones of the multiple sliding camshaft barrels into contact with at least one of: all of the intake valves; or all of the exhaust valves.

18 Claims, 4 Drawing Sheets

(51) Int. Cl.
*F02D 41/12* (2006.01)
*F01L 1/047* (2006.01)

(56) References Cited

U.S. PATENT DOCUMENTS

2017/0356375 A1* 12/2017 Glugla .................. B60W 10/06
2018/0258803 A1* 9/2018 Verner ................ F01L 13/0042

FOREIGN PATENT DOCUMENTS

DE 102013210487 A1 * 12/2014 .............. F01L 1/053
DE 102017105309 A1 * 9/2017 .............. F01L 1/047

* cited by examiner

DECELERATION CYLINDER CUT-OFF WITH SLIDING CAM

INTRODUCTION

The present disclosure relates to a system and method for controlling air flow through an internal combustion engine during periods of fuel cut-off.

Internal combustion engines having overhead cam designs include intake and exhaust valves that can be actuated by cam lobes of at least one camshaft. In some configurations the camshafts are constructed with sliding camshaft assemblies having multiple steps for varying the lift distance of an engine valve. For example, a three-step sliding camshaft may include a high-lift cam lobe position for lifting an engine valve to a maximum distance, a low-lift cam lobe position for lifting the engine valve below the maximum lift distance, and an active fuel management (AFM) or cylinder deactivated lobe position for operation using fewer than all of the available cylinders for maximizing fuel economy, which may provide a zero-lift distance.

At least one sliding camshaft actuator is fixed on an internal combustion engine for changing position between the multiple cam lobes. Multiple actuator pins of at least one camshaft actuator are operative to selectively engage displacement grooves configured on the periphery of camshaft barrels formed on the sliding camshaft assembly. As the camshaft assembly rotates, an individual actuator pin is selected to move into a displacement groove of a camshaft barrel which causes the sliding camshaft assembly to shift into a different position along the camshaft axis.

As the engine transitions into fuel cut-off mode during deceleration events, air containing oxygen may enter the engine manifold as the pistons continue operation in a zero-fueled (0-fueled) condition. If excessive oxygen passes through the engine to a downstream catalytic converter, the oxygen may saturate a catalyst substrate. Oxygen saturation may degrade emission standards being met as the engine returns to fueled operation.

Thus, while current engine systems to achieve complete engine cylinder deactivation achieve their intended purpose, there is a need for a new and improved system and method for achieving complete cylinder deactivation in an overhead camshaft internal combustion engine.

SUMMARY

According to several aspects, an overhead camshaft system of an automobile vehicle includes multiple camshafts individually having multiple sliding camshaft barrels. Opposed ends of the camshaft barrels individually include a zero-lift lobe. Multiple intake valves are operated by a first one of the camshafts and multiple exhaust valves are operated by a second one of the camshafts. Multiple actuators operate during a deceleration cylinder cut-off (DCCO) mode to slidably displace the camshaft barrels to position the zero-lift lobe of predetermined ones of the multiple sliding camshaft barrels into contact with at least one of: all of the intake valves; or all of the exhaust valves.

In another aspect of the present disclosure, the opposed ends of the camshaft barrel include a low-lift lobe positioned proximate to the zero-lift lobe.

In another aspect of the present disclosure, the opposed ends of the camshaft barrel include a high-lift lobe positioned proximate to the low-lift lobe.

In another aspect of the present disclosure, the high-lift lobe is positioned oppositely about the low-lift lobe with respect to the zero-lift lobe.

In another aspect of the present disclosure, in the DCCO mode, all cylinders of a multiple cylinder engine are deactivated with a fuel supply to the cylinders shut off.

In another aspect of the present disclosure, in the DCCO mode intake actuators of the multiple actuators shift the camshaft barrels such that selected ones of the multiple valves defining intake valves contact the zero-lift lobes thereby providing zero-lift, blocking air flow through the cylinders.

In another aspect of the present disclosure, in the DCCO mode exhaust actuators of the multiple actuators shift the camshaft barrels such that selected ones of the multiple valves defining exhaust valves contact the zero-lift lobes thereby providing zero-lift, blocking air flow through the cylinders.

In another aspect of the present disclosure, the multiple actuators operate during the deceleration cylinder cut-off (DCCO) mode to slidably displace the camshaft barrels to position the zero-lift lobe of predetermined ones of the multiple sliding camshaft barrels into contact with all of the intake valves and all of the exhaust valves.

In another aspect of the present disclosure, in an initial period, all of the cylinders are provided with fuel defining a steady-state operation of an engine, and during a second period fuel is cut-off on a cylinder-by-cylinder basis until a zero cylinder fueling condition is present initiating the DCCO mode.

In another aspect of the present disclosure, during the DCCO mode air leakage into an engine manifold occurs generating a manifold pressure, wherein to reduce the engine manifold pressure at the end of the DCCO mode a throttle is closed.

According to several aspects, an overhead camshaft system, includes an internal combustion engine of an automobile vehicle having multiple cylinders. Multiple camshafts include an intake camshaft and an exhaust camshaft. The multiple camshafts individually have multiple sliding camshaft barrels. Opposed ends of the camshaft barrels individually have a zero-lift lobe. Multiple intake valves are operated by the intake camshaft. Multiple intake actuators operate during a deceleration cylinder cut-off (DCCO) mode to slidably displace the camshaft barrels of the intake camshaft to position the zero-lift lobe of the multiple sliding camshaft barrels of the intake camshaft into contact with all of the intake valves.

In another aspect of the present disclosure, multiple exhaust valves are operated by the exhaust camshaft.

In another aspect of the present disclosure, multiple exhaust actuators operate in place of the multiple intake actuators during the deceleration cylinder cut-off (DCCO) mode to slidably displace the camshaft barrels of the exhaust camshaft to position the zero-lift lobe of the multiple sliding camshaft barrels of the exhaust camshaft into contact with all of the exhaust valves.

In another aspect of the present disclosure, multiple exhaust actuators operating in addition to the multiple intake actuators during the deceleration cylinder cut-off (DCCO) mode to slidably displace the camshaft barrels of the exhaust camshaft to position the zero-lift lobe of the multiple sliding camshaft barrels of the exhaust camshaft into contact with all of the exhaust valves simultaneously with the zero-lift lobe of the multiple sliding camshaft barrels of the intake camshaft being in contact with all of the intake valves.

In another aspect of the present disclosure, in an initial period, all of the cylinders are provided with fuel defining a steady-state operation of the internal combustion engine.

In another aspect of the present disclosure, during a second period fuel is cut-off on a cylinder-by-cylinder basis until a zero cylinder fueling condition is present initiating the DCCO mode.

In another aspect of the present disclosure, a throttle is closed to reduce an engine manifold pressure at an end of the DCCO mode.

According to several aspects, a method for achieving complete cylinder deactivation using an overhead camshaft system of an automobile vehicle includes: slidably mounting camshaft barrels on multiple camshafts; positioning a zero-lift lobe at opposed ends of the camshaft barrels; connecting multiple intake valves for operation by a first one of the camshafts and multiple exhaust valves for operation by a second one of the camshafts; and programming multiple actuators to operate during a deceleration cylinder cut-off (DCCO) mode to slidably displace the camshaft barrels to position the zero-lift lobe of predetermined ones of the multiple sliding camshaft barrels into contact with at least one of: all of the intake valves; or all of the exhaust valves.

In another aspect of the present disclosure, the method further includes: positioning a low-lift lobe at the opposed ends of the camshaft barrel proximate to the zero-lift lobe; and locating a high-lift lobe at the opposed ends of the camshaft barrel proximate to the low-lift lobe.

In another aspect of the present disclosure, the method further includes deactivating cylinders of a multiple cylinder engine by shutting off a fuel supply to all the cylinders to initiate the DCCO mode.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
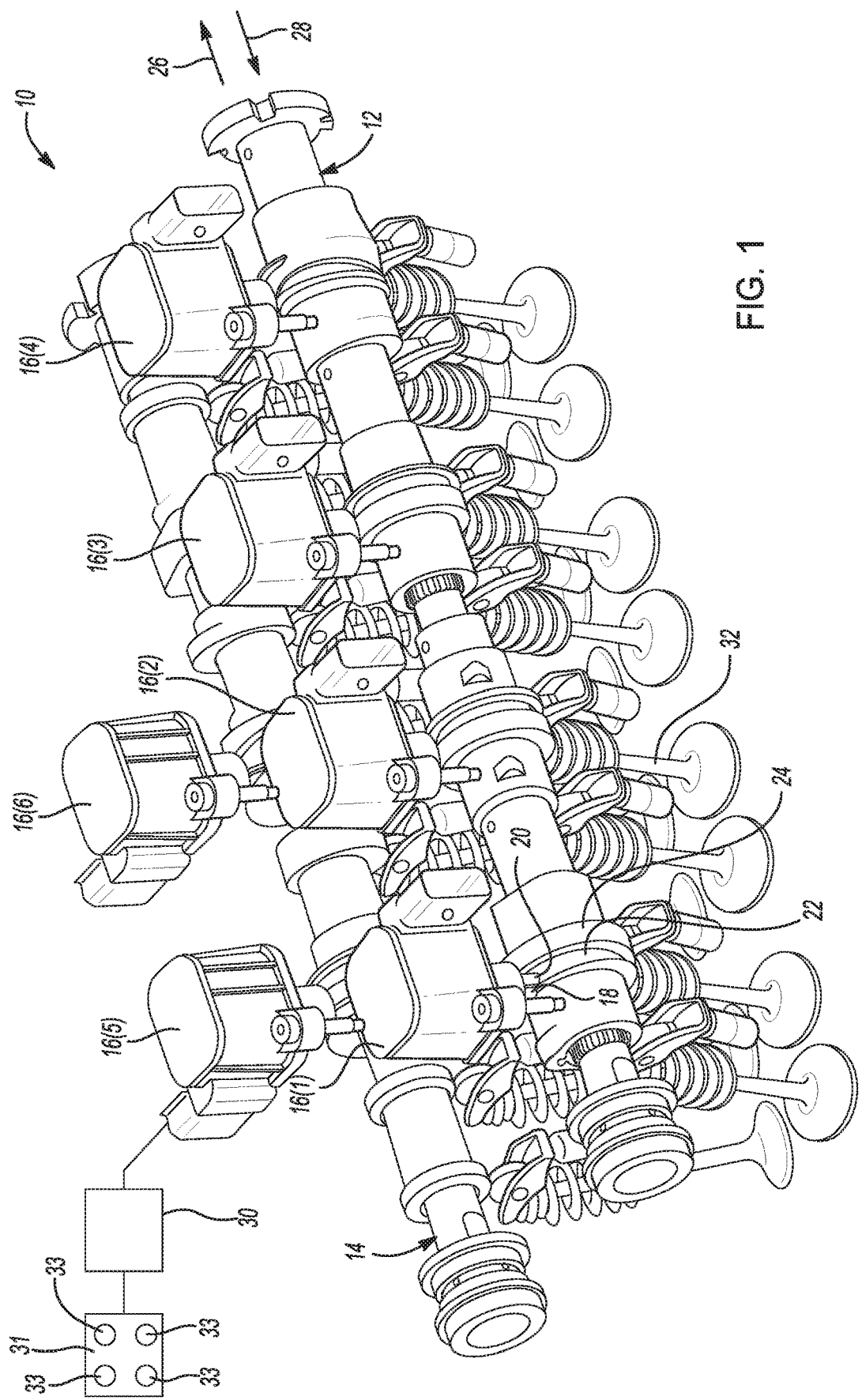
FIG. 1 is a front perspective view of an intake and an exhaust sliding camshaft configuration of an internal combustion engine overhead camshaft system according to an exemplary aspect.

Referring to FIG. 1, an intake and an exhaust sliding camshaft configuration for an exemplary 4-cylinder internal combustion engine overhead camshaft system and method of operation 10 is provided in accordance with aspects of an exemplary aspect. It is appreciated that the 4-cylinder aspect of an engine is merely exemplary and the present disclosure directed to deceleration cylinder cut-off, hereinafter DCCO, may be applied to other multiple cylinder engine camshaft system configurations, e.g., 2, 3, 5, 6, 8, 9, or 12, without exceeding the scope of the present disclosure.

The overhead camshaft system and method of operation 10 of an automobile vehicle includes at least one sliding camshaft having multiple camshaft barrels. According to several aspects, the overhead camshaft system and method of operation 10 includes a three (3) step intake sliding camshaft 12 and a two (2) or a three (3) step exhaust sliding camshaft 14. The camshaft actuators 16 include at least one actuation pin, and according to several aspects includes a first actuation pin 18 and a second actuation pin 20, which are individually and selectively extendible and retractable. The first actuation pin 18 and the second actuation pin 20 are individually received in one of multiple slots 22 created in individual ones of multiple camshaft barrels 24 slidably disposed on one of the intake sliding camshaft 12 or the exhaust sliding camshaft 14. Extension of one of the first actuation pin 18 or the second actuation pin 20 during axial rotation of the camshaft causes sliding motion of the camshaft barrel 24 in either a first direction 26 or an opposite second direction 28.

For shifting the position of the three step intake 12 and the exhaust sliding camshafts 14, at least one actuator 16 is provided in selective communication with the camshafts and commanded on and off by a control module, e.g., an engine control module 30 of an internal combustion engine 31 having an exemplary four cylinders 33. As noted herein, the engine 31 may have more or less than four cylinders within the scope of the present disclosure. Particular to this aspect, the overhead camshaft system and method of operation 10 includes a plurality of actuators 16(1) to 16(6), with actuators 16(1) to 16(4)) being operative for shifting the three step intake sliding camshaft 12, and at least two actuators 16(5) and 16(6) being operative for shifting the exhaust sliding camshaft 14 when commanded by the engine control module 30. The actuators 16(1) to 16(4) are operative to shift at least one and according to several aspects a pair of intake valves such as an exemplary first intake valve 32 of one of the cylinders. The actuators 16(5) to 16(6) are similarly operative to shift at least one and according to several aspects a pair of exhaust valves of one of the cylinders.

Referring to FIG. 2 and again to FIG. 1, the individual intake valve camshaft barrels such as the camshaft barrel 24 may include a high-lift lobe 34, a low-lift lobe 36, and a DCCO or zero-lift lobe 38 at opposed ends the camshaft barrel 24. According to several aspects, the high-lift lobe 34 is positioned proximate to the low-lift lobe 36 and is oppositely about the low-lift lobe 36 with respect to the zero-lift lobe 38. Depending on the axial position of the camshaft barrels 24, the intake valves such as the exemplary first intake valve 32 may contact the high-lift lobe 34, the low-lift lobe 36, or the DCCO or zero-lift lobe 38 of one of the camshaft barrels 24. According to several aspects, the four intake actuators 16(1), 16(2), 16(3), 16(4) may be used to achieve different combinations of modes. For example, the first and fourth intake actuators 16(1), 16(4) may be used during operation in a high-lift mode provided at the high-lift lobe 34 and in the low-lift mode having less lift than the high-lift mode provided at the low-lift lobe 36. The second and third intake actuators 16(2), 16(3) may also be independently used in a high-lift mode provided at the high-lift lobe 34 and the low-lift mode having less lift than the high-lift mode provided at the low-lift lobe 36.

Figure 2:
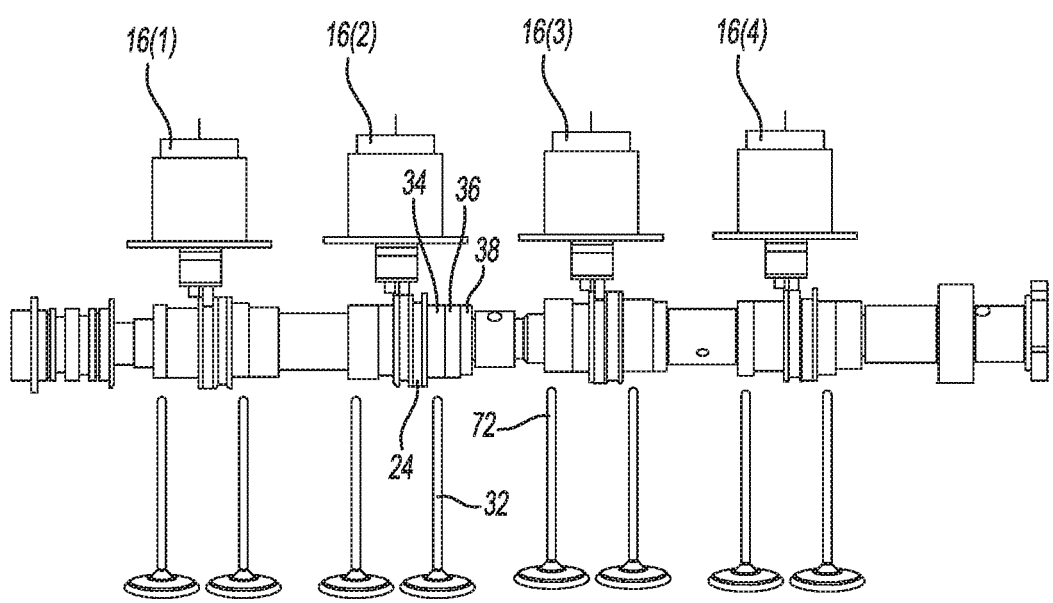
FIG. 2 is a side elevational view of the system of FIG. 1.

Referring to FIG. 3 and again to FIGS. 1 and 2, the first intake actuator 16(1) and the second intake actuator 16(2) are shown during a DCCO mode operation. The third intake actuator 16(3) and the fourth intake actuator 16(4) operate similarly and are therefore not shown for clarity. For DCCO mode operation, all four of the cylinders are deactivated with the fuel supply to the cylinders shut off. In DCCO mode operation the intake actuators shift the camshaft barrels such as a first camshaft barrel 24 and a second camshaft barrel 40 such that the intake valves contact the DCCO lobes thereby providing valve zero-lift, blocking or minimizing air flow through the engine cylinders.

According to several aspects, to achieve the DCCO mode operation the first camshaft barrel 24 is shifted such that the first intake valve 32 contacts a cam face 42 of the zero-lift lobe 38 of the first camshaft barrel 24 and a second intake valve 44 contacts a cam face 46 of a zero-lift lobe 38' of the first camshaft barrel 24. Similarly and at the same time, the second camshaft barrel 40 is shifted such that a third intake valve 48 contacts a cam face 50 of a zero-lift lobe 38" of the second camshaft barrel 40 and a fourth intake valve 52 contacts a cam face 54 of a zero-lift lobe 38''' of the second camshaft barrel 40.

According to several aspects, in DCCO mode individual ones of all of the intake valves may be positioned in contact with one of the zero-lift lobes of individual ones of the intake camshaft barrels. According to several aspects, in DCCO mode individual ones of all of the exhaust valves may be positioned in contact with one of the zero-lift lobes of individual ones of the exhaust camshaft barrels. According to further aspects, in DCCO mode all of the intake valves and all of the exhaust valves may be individually positioned in contact with one of the zero-lift lobes of individual ones of the intake camshaft barrels or the exhaust camshaft barrels.

The camshaft actuators are normally de-energized OFF unless valve lift is commanded to shift, thereby changing mode between the high-lift mode, the low-lift mode, and the DCCO mode. Coils of an intake actuator are energized to achieve the mode transitions.

Figure 3:
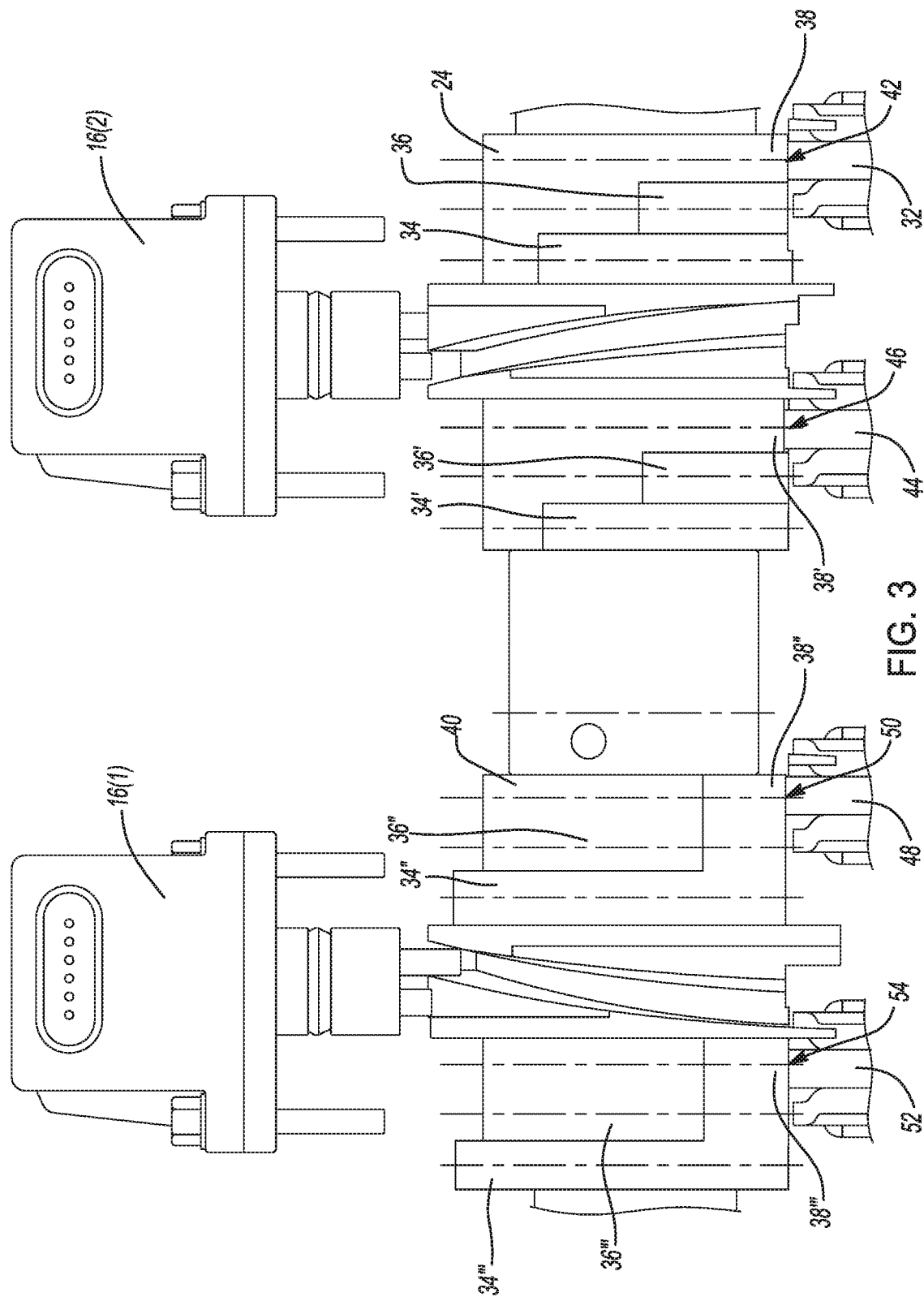
FIG. 3 is a side elevational view of two actuators of FIG. 2.
Figure 4:
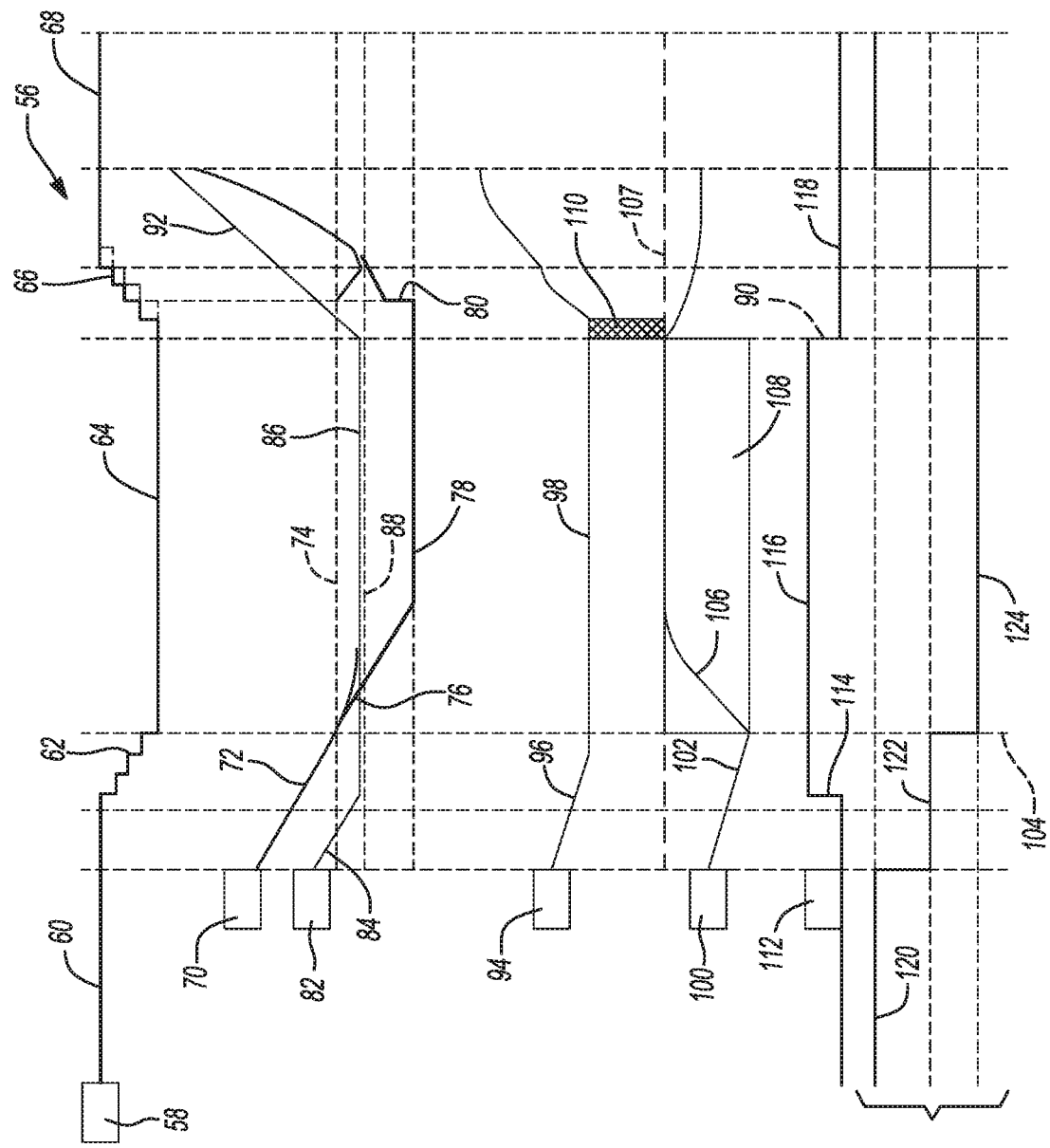
FIG. 4 is a graph of the method steps for operation of the system of FIG. 1.

Referring to FIG. 4 and again to FIGS. 1 through 3, a graph 56 identifies multiple elements to perform a method for operating the system of the present disclosure. In an initial period 58, all four of the cylinders are being provided with fuel defining a steady-state operation 60 of the engine. During a second period 62, fuel is cut-off on a cylinder-by-cylinder basis until a zero cylinder fueling condition 64 is present initiating a DCCO mode. At the end of the DCCO mode in a third period 66 fuel is reintroduced on a cylinder-by-cylinder basis until the engine returns to a full power operation 68. As the second period 62 fuel cut-off is occurring an unmanaged torque period 70 is initiated which is indicated by a declining torque curve 72 until a zero torque operation 74 occurs, after which a managed torque period 76 transitions into a predefined torque at a torque level 78. At the end of DCCO mode as the third period 66 when fuel is reintroduced is occurring a torque increase 80 is initiated. A predicted torque request 82 as a torque request signal has a first portion 84 which parallels the declining torque curve 72 until a signal portion 86 is reached at a predefined negative torque 88 which is maintained until an end of the DCCO 90 occurs at the start of the third period 66 when fuel is being reintroduced after which a positive trending signal portion 92 is defined.

Displacement of a throttle 94 generates a throttle signal which defines a declining throttle signal portion 96 during the second period 62 when fuel is cut-off on the cylinder-by-cylinder basis. A throttle signal portion 98 indicating no throttle change or demand is thereafter maintained throughout the DCCO mode. A manifold absolute pressure (MAP) signal 100 defines a negatively trending signal portion 102 until a DCCO mode start 104, which occurs at the end of the second period 62 when fuel cut-off to all cylinders is complete. After the DCCO mode start 104 the MAP signal defines a steadily increasing portion 106 until a predefined minimum engine torque 107 is reached and remains flat until the end of the DCCO 90 occurs. It is noted that during the DCCO mode all of the intake valves, all of the exhaust valves, or all of both the intake and the exhaust valves are closed, however air leakage into the engine manifold occurs, which defines an engine manifold pressure 108. To quickly reduce the engine manifold pressure 108 at the end of the DCCO 90 in a closing step 110 the throttle 94 may be closed to minimize oxygen discharged through to a catalytic converter (not shown).

A system controller such as the engine control module 30 described in reference to FIG. 1 collects system operation data. When predetermined conditions permitting the DCCO mode are present, a deceleration fuel-cut-off (DFCO) request signal 112 is generated by a system controller such as the engine control module 30 and undergoes a step increase 114 during the second period 62 when fuel is being cut-off on the cylinder-by-cylinder basis. The DFCO request signal 112 remains flat at a steady-state value 116 during the pendency of the DCCO mode and drops back to a zero value 118 at the end of the DCCO 90. An actual VCE state is represented having an FTC state 120 defining a low-lift condition defining for example a state occurring prior to initiation of a fuel cut-off having a high-lift state of at least two of the intake valves. The FTC state 120 transitions into a low-lift condition defining an RCE state 122 by transitioning the high-lift state intake valves to the low-lift state. The RCE state 122 then transitions into a DCCO mode or state 124.

An overhead camshaft system and method of operation 10 of the present disclosure offers several advantages. These include using existing sliding cam engine hardware to completely disable airflow through an engine, which prolongs zero-fueling states during deceleration/coastdown events. The present system and method use sliding cam technology to create 0-lift states on intake and/or exhaust cams to prevent airflow through an internal combustion engine. The present system and method reduces/eliminates movement of oxygen through the engine and across a catalyst, enabling prolonged fuel cut-off operation without oxygen saturating a catalyst substrate.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An automobile vehicle overhead camshaft system for an engine, comprising:
   multiple camshafts individually having multiple sliding camshaft barrels;
   opposed ends of the camshaft barrels individually having a zero-lift lobe;
   multiple intake valves operated by a first one of the camshafts and multiple exhaust valves operated by a second one of the camshafts, wherein the multiple intake valves comprise all of the intake valves associated with the engine and the multiple exhaust vales comprise all of the exhaust valves associated with the engine; and
   multiple actuators operating during a deceleration cylinder cut-off (DCCO) mode to slidably displace the camshaft barrels to position the zero-lift lobe of predetermined ones of the multiple sliding camshaft barrels into contact with at least one of: the multiple intake valves; or the multiple exhaust valves to completely shut down air flow into the engine.

2. The automobile vehicle overhead camshaft system of claim 1, wherein the opposed ends of the camshaft barrels include a low-lift lobe positioned proximate to the zero-lift lobe.

3. The automobile vehicle overhead camshaft system of claim 2, wherein the opposed ends of the camshaft barrels include a high-lift lobe positioned proximate to the low-lift lobe.

4. The automobile vehicle overhead camshaft system of claim 3, wherein the high-lift lobe is positioned oppositely about the low-lift lobe with respect to the zero-lift lobe.

5. The automobile vehicle overhead camshaft system of claim 1, further including multiple cylinders of the engine, wherein in the DCCO mode, all of the multiple cylinders are deactivated such that a fuel supply to the cylinders is shut off.

6. The automobile vehicle overhead camshaft system of claim 5, wherein in the DCCO mode, intake actuators of the multiple actuators shift the camshaft barrels and the intake valves contact the zero-lift lobe of the camshaft barrels thereby providing zero-lift, blocking air flow through the multiple cylinders.

7. The automobile vehicle overhead camshaft system of claim 5, wherein in the DCCO mode, exhaust actuators of the multiple actuators shift the camshaft barrels and of the multiple exhaust valves contact the zero-lift lobe of the camshaft barrels thereby providing zero-lift, blocking air flow through the multiple cylinders.

8. The automobile vehicle overhead camshaft system of claim 5, wherein in an initial period, all of the multiple cylinders are provided with fuel defining a steady-state operation of the engine, and during a second period the fuel is cut-off on a cylinder-by-cylinder basis until a zero cylinder fueling condition is present initiating the DCCO mode.

9. The automobile vehicle overhead camshaft system of claim 1, wherein the multiple actuators operate during the deceleration cylinder cut-off (DCCO) mode slidably to displace the camshaft barrels to position the zero-lift lobe of predetermined ones of the multiple sliding camshaft barrels into contact with the multiple intake valves and the multiple exhaust valves.

10. The automobile vehicle overhead camshaft system of claim 1, wherein during the DCCO mode air leakage into an engine manifold occurs generating an engine manifold pressure, and wherein to reduce the engine manifold pressure at an end of the DCCO mode a throttle is closed.

11. An overhead camshaft system, comprising:
an internal combustion engine of an automobile vehicle having multiple cylinders;
multiple camshafts including an intake camshaft and an exhaust camshaft, the multiple camshafts individually having multiple sliding camshaft barrels;
opposed ends of the camshaft barrels individually having a zero-lift lobe;
multiple intake valves operated by the intake camshaft, wherein the multiple intake valves comprise all of the intake valves associated with the internal combustion engine; and
multiple intake actuators operating during a deceleration cylinder cut-off (DCCO) mode to slidably displace the camshaft barrels of the intake camshaft to position the zero-lift lobe of the multiple sliding camshaft barrels of the intake camshaft into contact with the multiple intake valves.

12. The overhead camshaft system of claim 11, including multiple exhaust valves operated by the exhaust camshaft.

13. The overhead camshaft system of claim 12, including multiple exhaust actuators operating in addition to the multiple intake actuators during the deceleration cylinder cut-off (DCCO) mode to slidably displace the camshaft barrels of the exhaust camshaft to position the zero-lift lobe of the multiple sliding camshaft barrels of the exhaust camshaft into contact with all of the multiple exhaust valves simultaneously with the zero-lift lobe of the multiple sliding camshaft barrels of the intake camshaft being in contact with the multiple intake valves.

14. The overhead camshaft system of claim 11, wherein in an initial period, all of the multiple cylinders are provided with fuel defining a steady-state operation of the internal combustion engine.

15. The overhead camshaft system of claim 14, wherein during a second period the fuel is cut-off on a cylinder-by-cylinder basis until a zero cylinder fueling condition is present initiating the DCCO mode.

16. The overhead camshaft system of claim 11, further including a throttle closed to reduce an engine manifold pressure at an end of the DCCO mode.

17. A method for achieving complete cylinder deactivation using an overhead camshaft system for an engine of an automobile vehicle, comprising:
slidably mounting camshaft barrels on multiple camshafts;
positioning a zero-lift lobe at opposed ends of the camshaft barrels;
connecting multiple intake valves for operation by a first one of the camshafts and multiple exhaust valves for operation by a second one of the camshafts, wherein the multiple intake valves comprise all of the intake valves associated with the engine and the multiple exhaust vales comprise all of the exhaust valves associated with the engine; and
actuating multiple actuators to operate during a deceleration cylinder cut-off (DCCO) mode to slidably displace the camshaft barrels to position the zero-lift lobe of predetermined ones of the multiple sliding camshaft barrels into contact with at least one of: the multiple intake valves; or the multiple exhaust valves.

18. The method for achieving complete cylinder deactivation using the overhead camshaft system for the engine of the automobile vehicle of claim 17, further including:
positioning a low-lift lobe at the opposed ends of the camshaft barrels proximate to the zero-lift lobe; and
locating a high-lift lobe at the opposed ends of the camshaft barrels proximate to the low-lift lobe.

* * * * *